US008215534B2

(12) United States Patent
Takaguchi et al.

(10) Patent No.: US 8,215,534 B2
(45) Date of Patent: Jul. 10, 2012

(54) WAVE SOLDERING TANK

(75) Inventors: Akira Takaguchi, Toyama (JP); Issaku Sato, Tokyo (JP); Noboru Hashimoto, Toyama (JP); Junichi Okamura, Toyama (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 712 days.

(21) Appl. No.: 10/573,449

(22) PCT Filed: Oct. 8, 2004

(86) PCT No.: PCT/JP2004/014936
§ 371 (c)(1),
(2), (4) Date: Jan. 19, 2007

(87) PCT Pub. No.: WO2005/035176
PCT Pub. Date: Apr. 21, 2005

(65) Prior Publication Data
US 2008/0093417 A1    Apr. 24, 2008

(30) Foreign Application Priority Data
Oct. 10, 2003  (JP) .................................. 2003-352160

(51) Int. Cl.
*B23K 1/00*   (2006.01)
*B23K 31/02*  (2006.01)

(52) U.S. Cl. ........................... 228/37; 228/180.1; 228/33

(58) Field of Classification Search ............... 228/180.1, 228/257, 37, 260; 366/266, 415, 416, 417, 366/418
See application file for complete search history.

(56) References Cited

U.S. PATENT DOCUMENTS

| | | | | | |
|---|---|---|---|---|---|
| 3,407,984 | A | * | 10/1968 | Walker | 228/37 |
| 4,447,001 | A | * | 5/1984 | Allen et al. | 228/37 |
| 4,700,878 | A | | 10/1987 | Ciniglio | 228/37 |
| 4,773,583 | A | * | 9/1988 | Ishii et al. | 228/37 |
| 5,301,862 | A | * | 4/1994 | Shigematsu et al. | 228/43 |
| 5,769,305 | A | * | 6/1998 | Takeda et al. | 228/37 |
| 5,961,212 | A | * | 10/1999 | Haegeman | 366/266 |
| 7,165,933 | B2 | * | 1/2007 | Gerstenberg | 415/72 |
| 2004/0211816 | A1 | * | 10/2004 | Ogawa | 228/37 |

FOREIGN PATENT DOCUMENTS

| | | | |
|---|---|---|---|
| JP | 47006024 | | 9/1972 |
| JP | 51003632 | | 1/1976 |
| JP | 56023371 A | * | 3/1981 |
| JP | 58013470 A | * | 1/1983 |
| JP | 62168663 | | 7/1987 |
| JP | 62259665 | | 11/1987 |
| JP | 02205257 A | * | 8/1990 |
| JP | 08284885 | | 10/1996 |
| JP | 2003136233 | | 5/2003 |
| WO | 0133923 | | 5/2001 |
| WO | 03048579 | | 6/2003 |

* cited by examiner

*Primary Examiner* — David R Sample
*Assistant Examiner* — Megha Mehta
(74) *Attorney, Agent, or Firm* — Michael Tobias

(57) ABSTRACT

A wave soldering tank includes a soldering tank body for housing molten solder and a solder feed chamber disposed within the soldering tank body. An axial-flow, multiple-blade screw-type pump is disposed so as to draw molten solder into the solder feed chamber through an inlet and discharge the molten solder through an outlet. In a preferred embodiment, the pump includes a rotatable hub and a plurality of helical blades secured to the hub at equal intervals in the circumferential direction of the hub, each of the blades overlapping an adjoining one of the blades when the blades are viewed in the axial direction of the impeller.

15 Claims, 5 Drawing Sheets

WAVE SOLDERING TANK

TECHNICAL FIELD

This invention relates to a wave soldering tank having a pump for supplying molten solder within the tank to a nozzle.

BACKGROUND ART

A wave soldering tank typically includes a pump submerged within molten solder in the tank. When the pump is operated, molten solder is sucked into an inlet of the pump and then discharged from a nozzle communicating with an outlet of the pump. By suitably controlling the pump, the solder discharged from the nozzle can be formed into a wave through which electronic parts can be passed for soldering.

FIG. 1 is a schematic plan view of a conventional wave soldering tank disclosed in Japanese Published Unexamined Patent Application 2003-136233. As shown in this figure, a solder feed chamber 94 which is disposed in a soldering tank 90 includes a casing 92 in which a multiple-blade centrifugal pump 91 (such as a sirocco pump) is provided. The solder feed chamber 94 communicates with a nozzle 93 from which molten solder can be discharged.

With this conventional apparatus, only approximately ¼ of the entire periphery of the casing 92 is open for molten solder to be discharged therefrom to the solder feed chamber 94. At point A in FIG. 1, the molten solder discharged from the pump 91 is traveling approximately tangentially with respect to the pump 91. Point B is spaced from point A by approximately ¼ of the distance around the pump 91. There is a big difference in the discharge speed of molten solder between the vicinity of point A and the vicinity of point B, and this speed difference may produce undesirable undulations in solder which is discharged from the nozzle 93. In order to minimize the undulations, flow straightening plates (not shown) are commonly provided in a duct 94 leading from the casing 92.

DISCLOSURE OF THE INVENTION

In recent years, in order to increase productivity, there has been a demand for an increase in the speed of wave soldering machines, for the ability to perform wave soldering on a wider variety of parts, and for the ability to perform wave soldering on parts which in the past have been considered to be difficult to solder.

The present inventors found that such demands can be met by improving the structure of a soldering tank.

However, with the above-described pump shown in FIG. 1, molten solder is discharged from only approximately ¼ of the entire periphery of the pump, so the efficiency of the pump is poor. In addition, if flow straightening plates are provided to reduce undulations, oxidized dross adheres to and aggregate on the plates and leave the plates. Thus solder which is discharged from the nozzle becomes polluted. In addition, it is difficult to suppress undulations even with the provision of flow straightening plates.

Thus, one object of the present invention is to provide a wave soldering tank which can supply molten solder to a nozzle with good efficiency, which can eliminate undulations in solder discharged from the nozzle, and which can prevent oxidized coarse dross from being mixed into solder discharged from the nozzle.

Another object of the present invention is to provide a soldering tank which can more smoothly transport molten solder within a solder feed chamber and which can pressurize the interior of the solder feed chamber without the occurrence of turbulence.

The present invention provides a wave soldering tank comprising a soldering tank body for housing molten solder and a solder feed chamber disposed within the soldering tank body. The solder feed chamber has an inlet disposed below the level of molten solder in the soldering tank body and an outlet disposed above the level of molten solder in the soldering tank body. An axial-flow, multiple-blade screw-type pump is disposed in the soldering tank body so as to draw molten solder into the solder feed chamber through the inlet and discharge the molten solder through the outlet.

In preferred embodiments, the pump includes an impeller having a rotatable hub and a plurality of helical blades secured to the hub at equal intervals in the circumferential direction of the hub. Each of the blades overlaps an adjoining one of the blades when the blades are viewed in the axial direction of the impeller. The hub may be a cylinder or a solid shaft.

In a wave soldering tank according to the present invention, the pump is an axial-flow pump, so solder does not flow radially outwards from the pump but is transported in the axial direction of the pump. As a result, pressure is efficiently and uniformly applied to the interior of the solder feed chamber. If the rotation of the pump causes solder to be sent straight downwards, i.e., towards the bottom surface of the tank, when the bottom surface is horizontal, the solder is reflected and rises immediately beneath the pump. However, because the helical blades overlap each other as viewed in the axial direction of the impeller, solder cannot pass in a straight line through the pump, so solder is prevented from rising towards the pump. As a result, the pressure within the solder feed chamber can be uniformly increased without turbulence. "Each of the blades overlaps an adjoining one of the blades when the blades are viewed in the axial direction of the impeller" means that when, for example, the pump impeller has two helical blades spaced from each other around the hub by 180°, each helical blade spirals by at least 180° around the hub between the first and second ends of the blade. When the pump impeller has three helical blades disposed at intervals of 120°, each helical blade spirals around the hub by at least 120° between its first and second ends. This is the same for the case wherein four helical blades are provided. Thus, if the pump impeller includes N blades disposed at intervals of 360/N degrees around the hub, each blade spirals around the hub by at least 360/N degrees between its first and second ends.

BEST MODE FOR CARRYING OUT THE INVENTION

The structure of a wave soldering tank according to the present invention will be described in greater detail while referring to the accompanying drawings.

Figure 1:
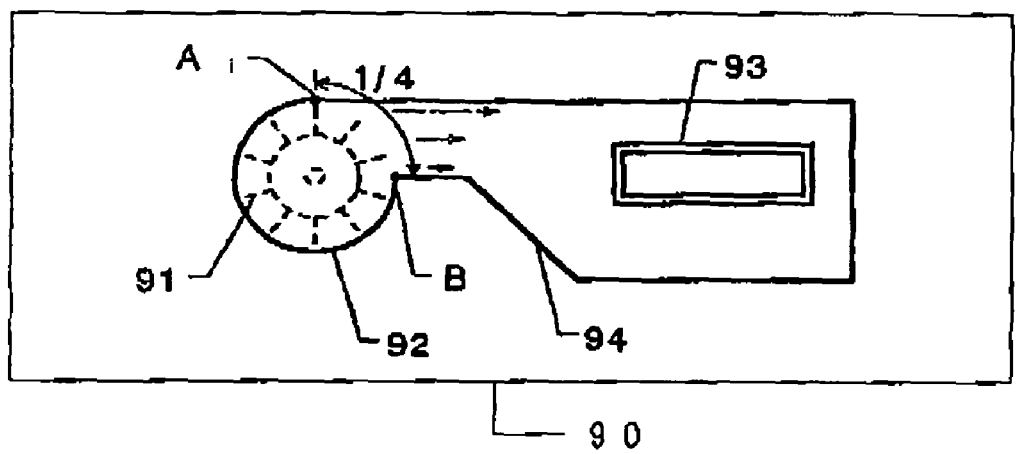
FIG. 1 is a schematic plan view of a conventional wave soldering tank.
Figure 2A:
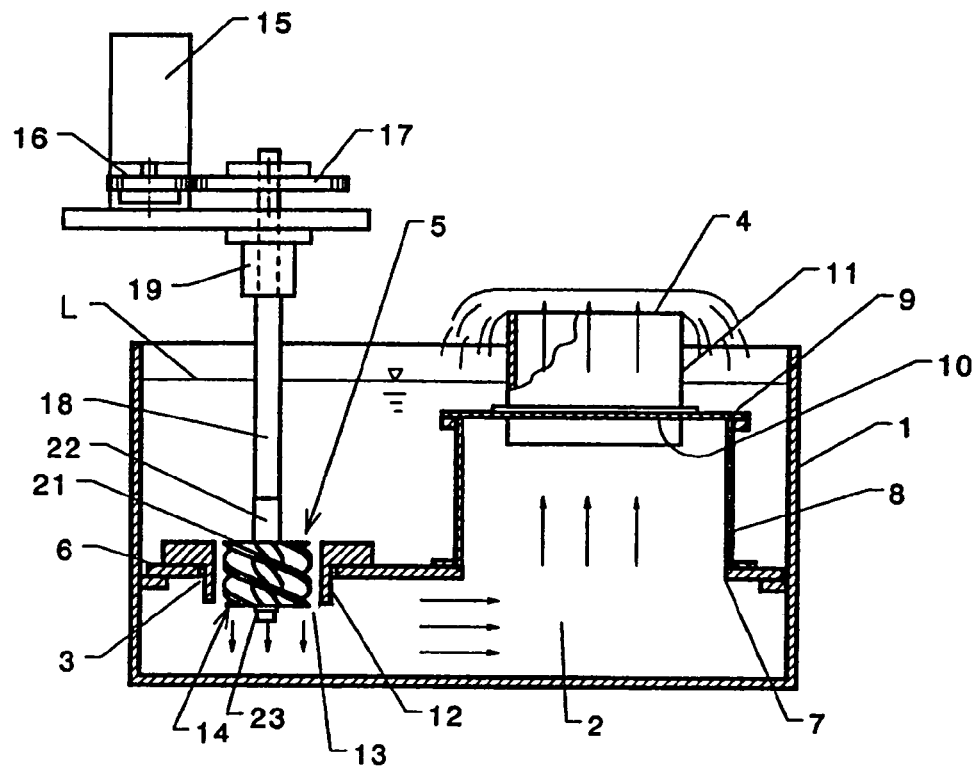
FIG. 2(a) is a front cross-sectional elevation of an embodiment of a wave soldering tank according to the present invention.
Figure 2B:
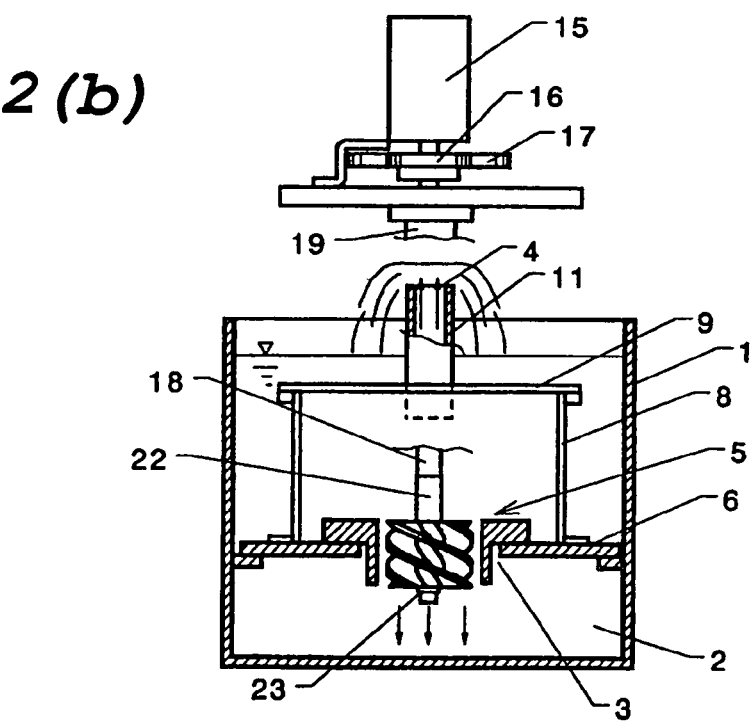
FIG. 2(b) is a side cross-sectional elevation thereof as viewed from the right in FIG. 2(a).

As shown in FIGS. 2(a) and 2(b), which are cross-sectional elevations of a first embodiment of a wave soldering tank according to the present invention, this embodiment includes a soldering tank body 1 which is open at its upper end and a solder feed chamber 2 disposed in the tank body 1.

The solder feed chamber 2 has an inlet 3 which is disposed lower than the liquid level L and an outlet 4 which is disposed higher than the liquid level L of molten solder in the tank body 1. A pump 5 is installed at the inlet 3.

In this embodiment, the solder feed chamber 2 includes a partition 6 which is disposed beneath the liquid level L in the tank body 1 and divides the interior of the tank body 1 into an upper and lower portion. The inlet 3 comprises a through hole formed in the partition 6. Another through hole 7 which communicates with the outlet 4 is formed in the partition 6 in a location spaced from the inlet 3. A duct 8 is secured to and extends upwards from the partition 6 at through hole 7. The upper end of the duct 8 is partially closed off by a lid 9 having a through hole 10 with an area smaller than the horizontal cross-sectional area of the duct 8. A nozzle 11 is installed in the through hole 10 and extends upwards from the lid 9 to above the liquid level L in the tank body 1. The outlet 4 of the solder feed chamber 2 comprises the upper end of the nozzle 11, from which molten solder can be discharged to form a wave.

The solder feed chamber 2 may be an independent structure which is installed on the bottom of the soldering tank body 1, but taking into consideration the buoyancy of molten solder, the above-described structure using a partition 6 is simpler and therefore preferable.

Figure 3:
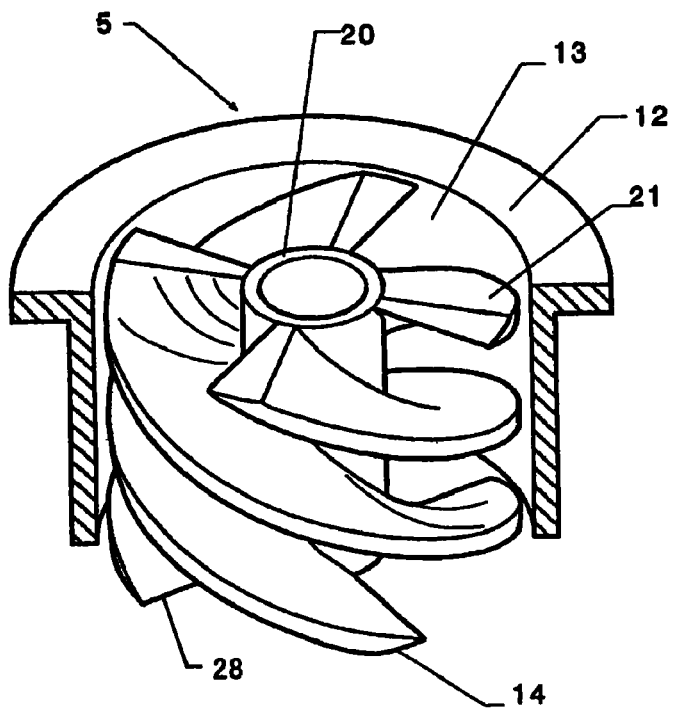
FIG. 3 is a cutaway perspective view of the pump of the embodiment of FIGS. 2(a) and 2(b).
Figure 4A:
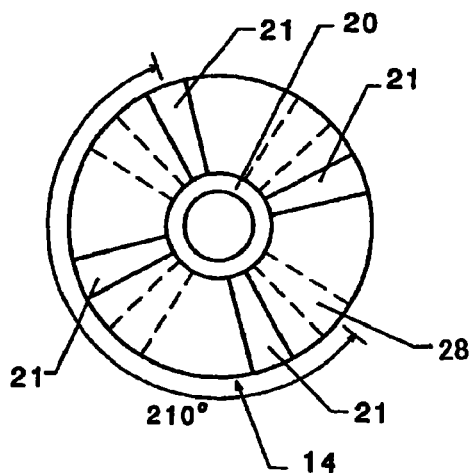
FIG. 4(a) is a plan view of the impeller of the pump of FIG. 3.
Figure 4B:
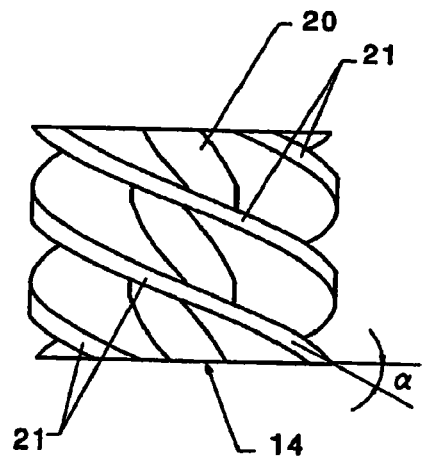
FIG. 4(b) is an elevation of the impeller.

As shown in detail in FIGS. 3, 4(a), and 4(b), the axial-flow pump 5 used in the present embodiment includes a cylindrical casing 12 having a cylindrical interior 13, and a multiple-blade screw-shaped impeller 14 disposed in the casing 12 for rotation about its longitudinal axis inside the casing 12. The impeller 14 shown in the Figures has four blades. The impeller 14 may have two or more blades 21. Preferably it has at least four blades 21.

The length of the casing 12 is usually such as to surround the impeller 14 over its entire length. Therefore, the length of the casing 12 may be the same as or a little shorter than the overall length of the impeller 14. Preferably, the end of the impeller 14 extends 5-10 mm ahead of the end of the casing so that the molten solder can be smoothly and uniformly supplied to the solder feed chamber 2.

The impeller 14 may be rotated about its axis by any suitable drive mechanism. In the present embodiment, as shown in FIGS. 2(a) and 2(b), the impeller 14 is secured to the lower end of a drive shaft 18 which is rotatably supported by a bearing 19. The drive shaft 18 can be rotated by an electric motor 15 which is drivingly connected to the drive shaft 18 by gears 16 and 17. The drive mechanism including the motor 15 and the gears 16 and 17 may be supported in any suitable manner, such as by an unillustrated support secured to the tank body 1 or the partition 6.

As best shown in FIG. 3, the illustrated impeller 14 includes a cylindrical hub 20 and a plurality of helical blades 21 (four in this embodiment) mounted on the hub 20 at equal intervals around the circumference of the hub 20. The upper and lower end surfaces 28 of the blades 21 are preferably flush with the upper and lower surfaces of the hub 20.

Each of the helical blades 21 extends helically around the hub 20 between the first and second lengthwise ends of the hub 20. The angle of spiral, i.e., the angle between the first and second ends of each blade 21 as measured from the center of the hub 20 is such that when the impeller 14 is viewed in its axial direction, each of the blades 21 overlaps an adjoining one of the blades 21 in the circumferential direction of the impeller 14. When the impeller 14 includes four equally spaced blades 21, the angle of spiral is at least 90°, preferably at least 120°, and ideally at least 180°. As shown in FIG. 4(a), in the illustrated embodiment, the angle of spiral of each blade 21 is 210°. The smaller the angle of slope α (shown in FIG. 4(b)) of the blades 21 with respect to a plane perpendicular to the axis of the impeller 14, the more easily pressure can be applied to molten solder in the solder feed chamber 2, so the angle of slope α is preferably at most 45°.

The impeller 14 may be secured to the drive shaft 18 in any convenient manner. In the illustrated embodiment, the hub 20 (FIG. 3) fits over the lower end of the drive shaft 18, with the upper end of the hub 20 pressed against a step portion 22 formed on the drive shaft 18 and the lower end of the hub 20 pressed by a flange 23 secured to the lower end of the drive shaft 18 beneath the hub 20. Thus, as shown in FIGS. 2(a) and 2(b), the hub 20 is sandwiched from above and below.

Figure 5:
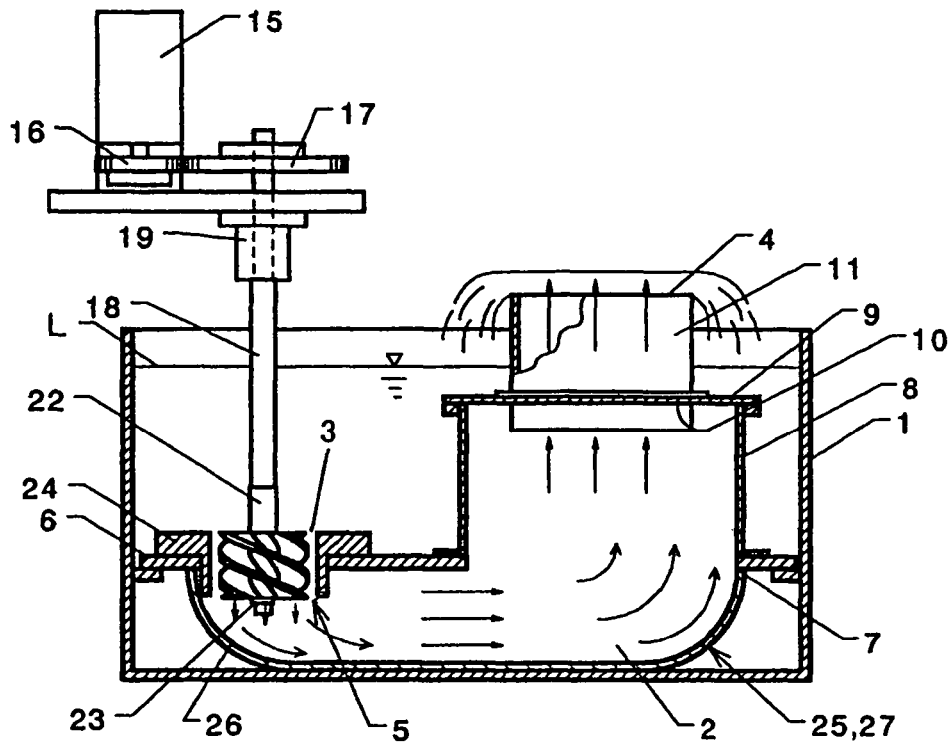
FIG. 5 is a front cross-sectional view of another embodiment of a wave soldering tank according to the present invention.

FIG. 5 illustrates another embodiment of a wave soldering tank according to the present invention. The same parts as in FIGS. 2(a) and 2(b) are indicated by the same reference numbers. In this embodiment, a dish-shaped guide 25 for smoothly guiding solder between the inlet 3 and the outlet 4 is secured to the lower side of the partition 6. The portions of the guide 25 immediately below the inlet 3 and the through hole 7 in the partition 6 have curved surfaces 26 and 27, such as surfaces described by an arc of a circle. Solder which is discharged by the pump 5 proceeds straight downwards from the pump 5 and then strikes curved surface 26 and is led in the horizontal direction. The solder then strikes against the other curved surface 27 and is led straight upwards. In this manner, the efficiency of transport of molten solder in the solder feed chamber 2 is improved. The structure of this embodiment is otherwise the same as that of the preceding embodiment.

According to the present invention when the pump 5 is driven, molten solder in the tank is sucked through the upper end of the casing 12 and is then discharged downwards through four blades into the lower end of the casing 12, i.e., into the solder feed chamber 2. As the impeller 14 rotates, the location where the solder is discharged by the impeller 14 also rotates, so by uniformly discharging solder along the entire periphery of the lower end of the pump 5 except for the region immediately beneath the hub 20, the efficiency of the pump 5 is increased, and the pressure applied to the interior of the solder feed chamber 2 is the same in any location.

Accordingly, almost no undulations occur in the solder which is discharged from the outlet 4. If the rotational speed of the impeller 14 is maintained constant, the height of the solder which is discharged from the outlet 4 can be always maintained constant. Alternatively, by adjusting the rotational speed of the impeller 14, the height of the solder within the outlet 4 can be adjusted. Thus, the height of the molten solder in the outlet 4 can be adjusted by controlling the rotational speed of the impeller 14.

Figure 6A:
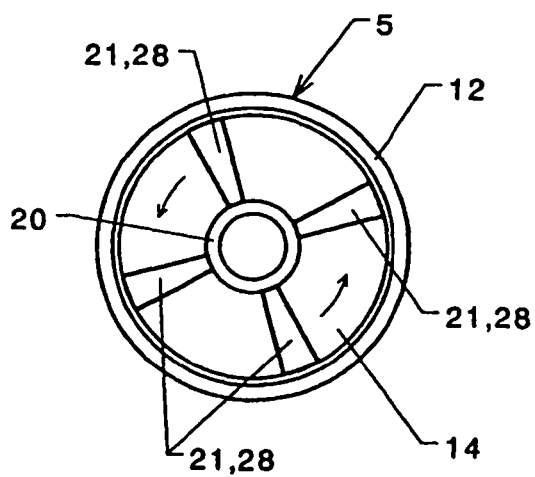
FIG. 6(a) is a bottom plan view of a pump used in the present invention.
Figure 6B:
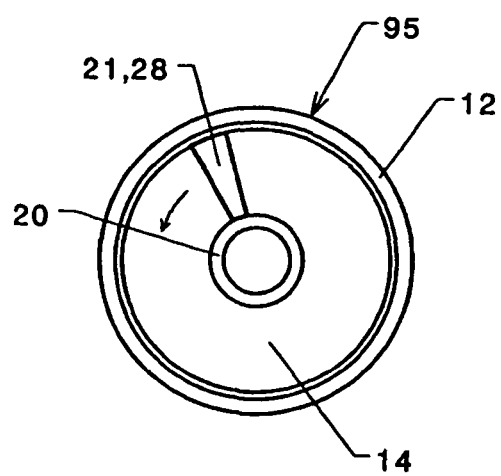
FIG. 6(b) is a bottom view of a conventional pump for a wave soldering tank.

FIG. 6(a) and FIG. 6(b) are bottom plan views of a pump used in the present invention, i.e., a pump 5 having a impeller 14 having a plurality of helical blades 21, and of a comparative example of a pump 95, i.e., a pump using a impeller 14 having a single helical blade 21, respectively.

It is thought that with a screw-shaped impeller, solder is most efficiently discharged from the vicinity of the lower end surface 28 of each helical blade 21. See FIG. 6(b). Therefore, in the case of a pump 95 having a single helical blade 21, solder is thought to be discharged from a single location. When the impeller 14 is rotating at a low speed, the location from which solder is discharged slowly rotates by 360° in the circumferential direction of the impeller, and this produces undulations in the discharged solder. In order to prevent such undulations and discharge solder uniformly around the entire circumference of the lower end of the impeller 14, it is necessary to rotate the impeller 14 at a high speed. However, in order to achieve a high speed of rotation, it is necessary to markedly increase the strength of the impeller 14 itself in order to prevent breakage thereof. In addition, a high speed of rotation results in a large amount of solder being discharged from the impeller 14, and it becomes difficult to perform fine adjustment of the height of the solder which is discharged from the outlet.

In contrast, with a plurality of helical blades 21 disposed at equal intervals as in the present invention, as can be seen from FIG. 6(a), solder is charged from a plurality of locations around the circumference of the impeller, and the locations from which solder is discharged are well balanced in the circumferential direction, so even at a lower rotational speed than in the comparative example, solder can be discharged uniformly around the circumference of the lower end of the impeller. Because a low rotational speed can be used, fine adjustment of the height of the solder which is discharged from the outlet can be easily carried out.

In the case of the wave soldering tank shown in FIGS. 2(a) and 2(b), if solder is discharged directly downwards by the pump 5, due to reflection of the solder off the bottom surface of the tank body 1, a directly upward force is applied which prevents solder from being transported by the lower bottom surface of the soldering tank body 1. However, it is thought that this force is effectively suppressed by the helical blades 21 and particularly by the lower end surface 28 of the blades 21. Thus, by providing a plurality of helical blades 21 and installing them at equal intervals, an upward force exerted by reflected solder can be suppressed markedly more efficiently than in the comparative example.

Figure 7:
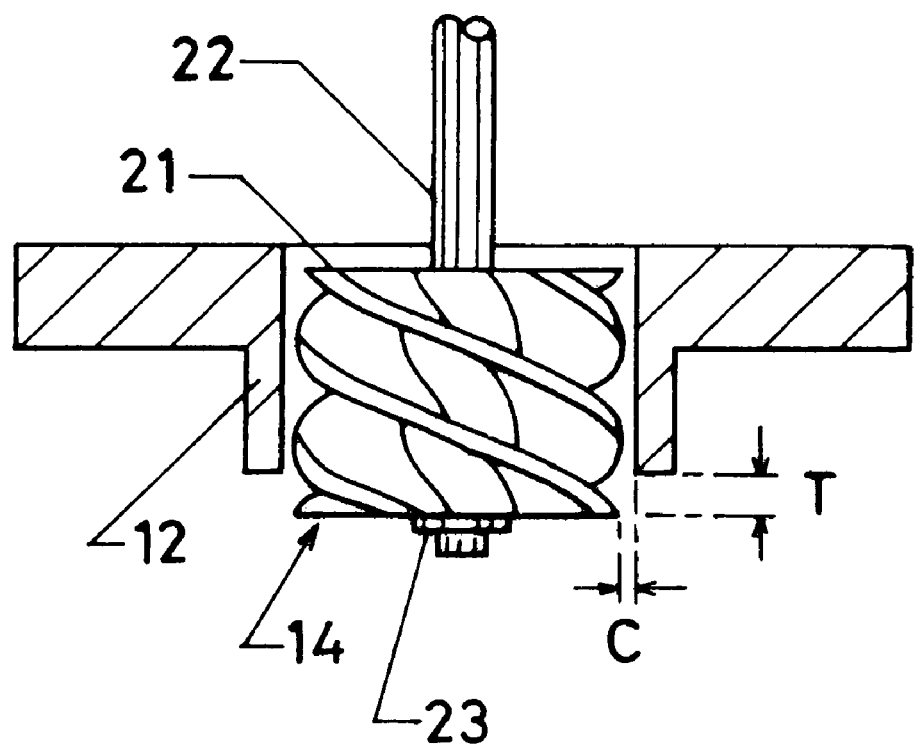
FIG. 7 is a front view of another embodiment of a pump used in the present invention.

FIG. 7 illustrates an arrangement of the casing and the pump, in which in a preferred embodiment the distance T, i.e., the length by which the impeller extends beyond the end of the casing is defined as 5-10 mm so that the molten solder can be charged uniformly to the solder feed chamber 2. Furthermore, according to another preferred embodiment, clearance C between the inner wall of the casing 12 and the screw, i.e., helical blades are defined as 0.1-1 mm so as to supply molten solder uniformly without formation of pulsating flow.

INDUSTRIAL APPLICABILITY

In a wave soldering tank according to the present invention, molten solder is uniformly discharged from the lower end of a pump over the entirety of the bottom surface of the pump except for the region immediately beneath the hub of he pump, so compared to a wave soldering tank using a conventional pump in which molten solder is discharged from a region of only ¼ of the entire periphery of the pump, the efficiency of transport of solder is improved. In addition, molten solder is uniformly discharged from most of the entire bottom surface of the pump, so turbulence is eliminated, and the pressure applied to the solder feed chamber becomes the same in any position. As a result, almost no undulations are observed in the flow of molten solder which is discharged from an outlet through a nozzle without the need for flow straightening plates. In addition, since flow straightening plates become unnecessary, oxidized dross is not introduced into solder which is discharged from the outlet, so the cleanliness of solder is increased.

The invention claimed is:

1. A soldering tank comprising a soldering tank body for housing molten solder, a horizontal partition extending across the tank body below the level of molten solder in the tank body and creating a barrier between an upper portion of the tank body located above the partition and a lower portion of the tank body located below the partition and supported by side walls of the tank body such that molten solder is prevented from flowing from the upper portion to the lower portion of the tank body between the side walls of the tank body and the outer periphery of the partition around the entire periphery of the partition, the partition having first and second openings horizontally spaced from each other, a bowl-shaped guide secured to a lower side of the partition and having curved surfaces which are curved directly beneath the first and second openings for guiding fluid beneath the first and second openings, a nozzle having a lower end in fluid communication with the second opening in the partition and an upper end disposed above the level of molten solder in the tank body, and a multiple-blade screw-type pump having an impeller disposed so as to pump molten solder downwards through the first opening into a space between the partition and the bowl-shaped guide.

2. A soldering tank as claimed in claim 1 wherein the impeller is disposed in the first opening of the partition.

3. A soldering tank as claimed in claim 1 wherein the impeller includes at least four helical blades.

4. A soldering tank as claimed in claim 3, wherein each of the blades overlaps an adjoining one of the blades when the blades are viewed in the axial direction of the impeller.

5. A soldering tank as claimed in claim 4 wherein the blades are provided at equal intervals in the circumferential direction of the impeller, each blade extending in the circumferential direction by at least 120° between first and second ends of the blade.

6. A soldering tank as claimed in claim 3 wherein each of the blades is sloped by at most 45° with respect to a plane perpendicular to a rotational axis of the impeller.

7. A soldering tank as claimed in claim 1 including a duct extending upwards from the partition above the second opening and communicating between the second opening and the lower end of the nozzle.

8. A soldering tank as claimed in claim 7 wherein there is no flow straightening plate in the soldering tank between the pump and an interior of the nozzle.

9. A soldering tank as claimed in claim 1 wherein each curved surface is curved from the lower side of the partition to directly beneath one of the first and second openings.

10. A soldering tank as claimed in claim 9 wherein each of the curved surfaces comprises an end wall of the guide.

11. A soldering tank as claimed in claim 1 wherein the bowl-shaped guide is disposed inside the tank body between the partition and a bottom inner surface of the tank body.

12. A soldering tank as claimed in claim 1 wherein the partition is a flat plate extending to a vicinity of the side walls of the tank body.

13. A soldering tank as claimed in claim 1 including a cylindrical casing disposed in the first opening of the partition surrounding the impeller, the impeller being rotatably disposed in the casing so as to transport molten solder in an axial direction of the casing.

14. A soldering tank as claimed in claim 13 wherein a lower end of the impeller extends 5-10 mm below a lower end of the casing.

15. A soldering tank as claimed in claim 13 wherein a clearance between the casing and the impeller is 0.1-1 mm.

* * * * *